No. 615,805. Patented Dec. 13, 1898.
J. H. CARSE.
CROSSCUT SAW.
(Application filed Dec. 6, 1897.)
(Model.)
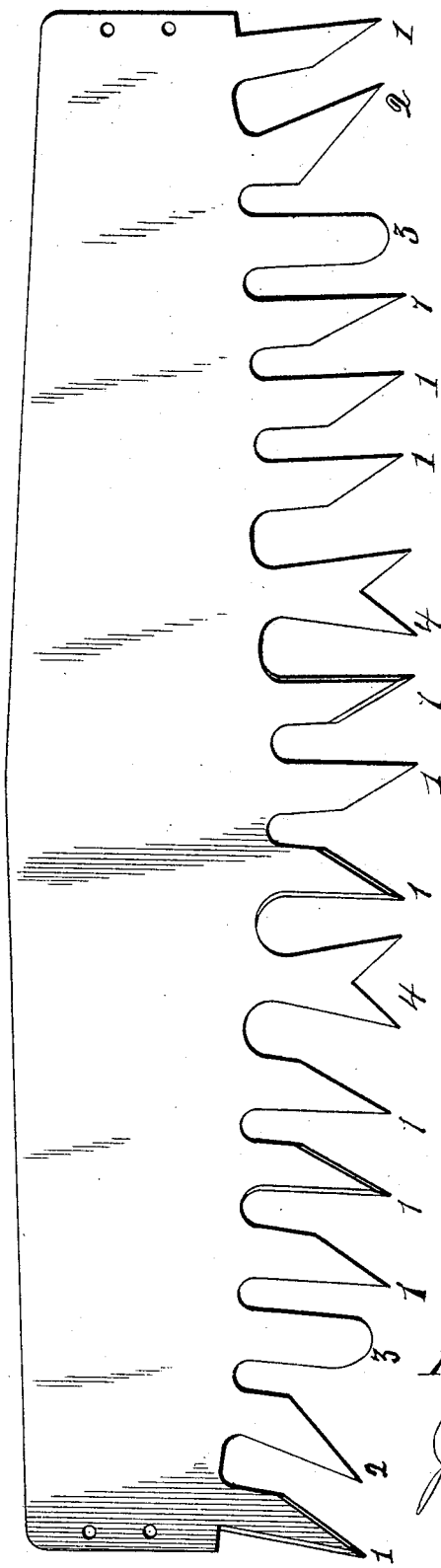
Witnesses.
W. S. Jacobs
Robert Orr
Inventor.
Joseph H. Carse

UNITED STATES PATENT OFFICE.

JOSEPH H. CARSE, OF SOUTH SEATTLE, WASHINGTON.

CROSSCUT-SAW.

SPECIFICATION forming part of Letters Patent No. 615,805, dated December 13, 1898.

Application filed December 6, 1897. Serial No. 661,001. (Model.)

*To all whom it may concern:*

Be it known that I, JOSEPH H. CARSE, of South Seattle, county of King, State of Washington, have invented an Improvement in Saws, of which the following is a specification.

The drawing shows a side view of my improved saw.

The improvement relates to the form and arrangement of saw-teeth.

There are three kinds of teeth in my saw—cutting-teeth 1, chisel or rake teeth 2 and 4, and gage-teeth 3. The cutting-teeth 1 have straight beveled forward faces or cutting edges, and their ends are also beveled on the side to form cutting edges and inclined from the front inward from ends toward center of saw. Said teeth are alternately beveled or sharpened on opposite sides, as is usual. To remove the chips cut by said teeth, I provide the chisel or rake teeth 2 and 4, the teeth 4 being double to act in either direction. The chisel-teeth 2 are inclined forward from center toward the ends of the saw or in the direction in which they are intended to be effective. To govern the tendency of the chisel-teeth 2 to draw the saw into the wood, I have provided the gage-teeth 3, which have straight parallel side edges and curved or arc-shaped ends and are placed directly adjacent to and behind said chisel-teeth 2. The ends of these gage-teeth 3 may be ground down as the saw is ground away in sharpening or in proportion to the degree the operator may desire said chisel-teeth 2 to enter the wood in order to properly govern the draw of the latter.

What I claim as my invention, and desire to secure by Letters Patent, is—

In a saw straight-faced beveled cutting-teeth having their ends beveled likewise and inclined inward toward their back and chisel or rake teeth inclined forward in combination with gage-teeth having straight parallel sides and rounded ends placed next behind the rake-teeth to govern their tendency to draw the saw into the wood.

JOSEPH H. CARSE.

Witnesses:
 ROBERT ORR,
 FRED BOYER.